US007612356B2

(12) United States Patent
Utida et al.

(10) Patent No.: US 7,612,356 B2
(45) Date of Patent: Nov. 3, 2009

(54) RAINDROP SENSOR FOR DETECTING RAIN ON A VEHICLE WINDSHIELD INCLUDING AN IMAGE SENSOR AND PROCESSOR FOR PERFORMING A FREQUENCY ANALYSIS OF AN IMAGE AND WIPER CONTROLLER HAVING THE SAME

(75) Inventors: Akira Utida, Okazaki (JP); Masayuki Imanishi, Okazaki (JP); Katsunori Michiyama, Toyota (JP); Atsushi Yamamoto, Nagoya (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 11/798,638

(22) Filed: May 15, 2007

(65) Prior Publication Data
US 2007/0272884 A1 Nov. 29, 2007

(30) Foreign Application Priority Data
May 16, 2006 (JP) .............................. 2006-136007

(51) Int. Cl.
*G01N 15/06* (2006.01)
*G01N 21/49* (2006.01)
*G01N 21/85* (2006.01)
*G02B 6/42* (2006.01)

(52) U.S. Cl. ................. 250/573; 250/227.25; 340/602; 318/643

(58) Field of Classification Search .............. 250/208.1, 250/227.25, 573–575, 205; 340/602, 438, 340/601; 73/29.05, 335.01; 318/643, 440, 318/483
See application file for complete search history.

(56) References Cited

U.S. PATENT DOCUMENTS

| 5,923,027 | A  | * | 7/1999  | Stam et al. ............... 250/208.1 |
| 6,555,804 | B1 |   | 4/2003  | Blasing |
| 7,310,190 | B2 | * | 12/2007 | Fox ........................... 359/666 |
| 2005/0035926 | A1 |   | 2/2005 | Takenaga et al. |
| 2005/0206511 | A1 | * | 9/2005 | Heenan et al. .............. 340/438 |
| 2006/0243894 | A1 |   | 11/2006 | Takenaga et al. |

FOREIGN PATENT DOCUMENTS

| JP | 10062559 A | * | 3/1998 |
| JP | A-2001-141838 |   | 5/2001 |
| JP | A-2001-153969 |   | 6/2001 |

* cited by examiner

*Primary Examiner*—Thanh X Luu
*Assistant Examiner*—Francis M Legasse, Jr.
(74) *Attorney, Agent, or Firm*—Posz Law Group, PLC

(57) ABSTRACT

A raindrop sensor includes an image sensor and an image processor. The image sensor captures an image of a windshield from inside a vehicle. The image processor performs a frequency analysis of the image to detect a high-frequency component in the image. When the high-frequency component is detected, the image processor detects a width of a change region where a change in gradation of the image occurs. When the width of the change region is within a predetermined range corresponding to a diameter of a raindrop, the image processor determines that the raindrop is on the windshield. Even when a foreign matter such as a water stain appears as the high-frequency component as a result of the frequency analysis, the raindrop and the foreign matter can be distinguished from each other based on the width of the change region.

1 Claim, 13 Drawing Sheets

RAINDROP SENSOR FOR DETECTING RAIN ON A VEHICLE WINDSHIELD INCLUDING AN IMAGE SENSOR AND PROCESSOR FOR PERFORMING A FREQUENCY ANALYSIS OF AN IMAGE AND WIPER CONTROLLER HAVING THE SAME

CROSS REFERENCE TO RELATED APPLICATION

This application is based on and incorporates herein by reference Japanese Patent Application No. 2006-136007 filed on May 16, 2006.

FIELD OF THE INVENTION

The present invention relates to a raindrop sensor and a wiper controller having the raindrop sensor.

BACKGROUND OF THE INVENTION

A raindrop sensor disclosed in JP-A-2001-153969 captures an image of a vehicle windshield and performs a frequency analysis of the image. When a raindrop is on the windshield, the raindrop appears as a high-frequency component in the image as a result of the frequency analysis. The raindrop sensor detects the presence and amount of the raindrop based on the amplitude of the high-frequency component. However, the raindrop sensor may incorrectly detect a foreign matter (e.g., water stain) on the windshield as the raindrop, because the foreign matter may appear as the high-frequency component. Further, since the frequency analysis relies on an outline of the raindrop, the raindrop may not appear as the high-frequency component in the case where the outline of the raindrop is blurred. Therefore, if a large portion of the windshield is covered with water, for example, by a splash from a passing vehicle, the raindrop sensor may not detect the splash.

An image processing system disclosed in US 2006/0243894A1 corresponding to JP-A-2005-195566 includes a lamp for emitting light to a windshield and an image sensor for capturing an image of the light reflected from the windshield. A raindrop on the windshield is detected by analyzing the image. However, the image processing system is based on the assumption that the windshield is water-repellent and the raindrop on the windshield is round like a ball. Therefore, in the case where the windshield is not water-repellent or the windshield is covered with water, the image processing system may not accurately detect the raindrop.

SUMMARY OF THE INVENTION

In view of the above-described problem, it is an object of the present invention to provide a raindrop sensor for accurately detecting a raindrop on a vehicle windshield and a wiper controller having the raindrop sensor.

A raindrop sensor includes capturing means, high-frequency component determination means, gradation change detection means, and raindrop determination means. The capturing means captures an image of a windshield from inside a vehicle. The high-frequency component determination means performs a frequency analysis of the image and determines based on a result of the frequency analysis whether the image has a high-frequency component. The gradation change detection means operates when the image has the high-frequency component to detect a width of a change region where a change in gradation of the image occurs. The raindrop determination means determines that the raindrop is on the windshield when the width of the change region is within a predetermined range corresponding to a diameter of the raindrop. The capturing means may be provided by an image sensor. Each of the high-frequency component determination means, the gradation change detection means, and the raindrop determination means may be provided by an image processor.

According to the raindrop sensor, a presence of the raindrop on the windshield is determined based on both a presence of the high-frequency component in the image and the width of the change region where the change in gradation of the image occurs. Even when a foreign matter such as a water stain appears as the high-frequency component as a result of the frequency analysis, the raindrop and the foreign matter can be accurately distinguished from each other based on the width of the change region. Thus, the raindrop sensor can accurately detect the raindrop on the windshield.

A wiper controller includes the raindrop sensor and control means for controlling a windshield wiper in accordance with an amount of the raindrop detected by the raindrop sensor. The controlling means may be provided by the image sensor.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
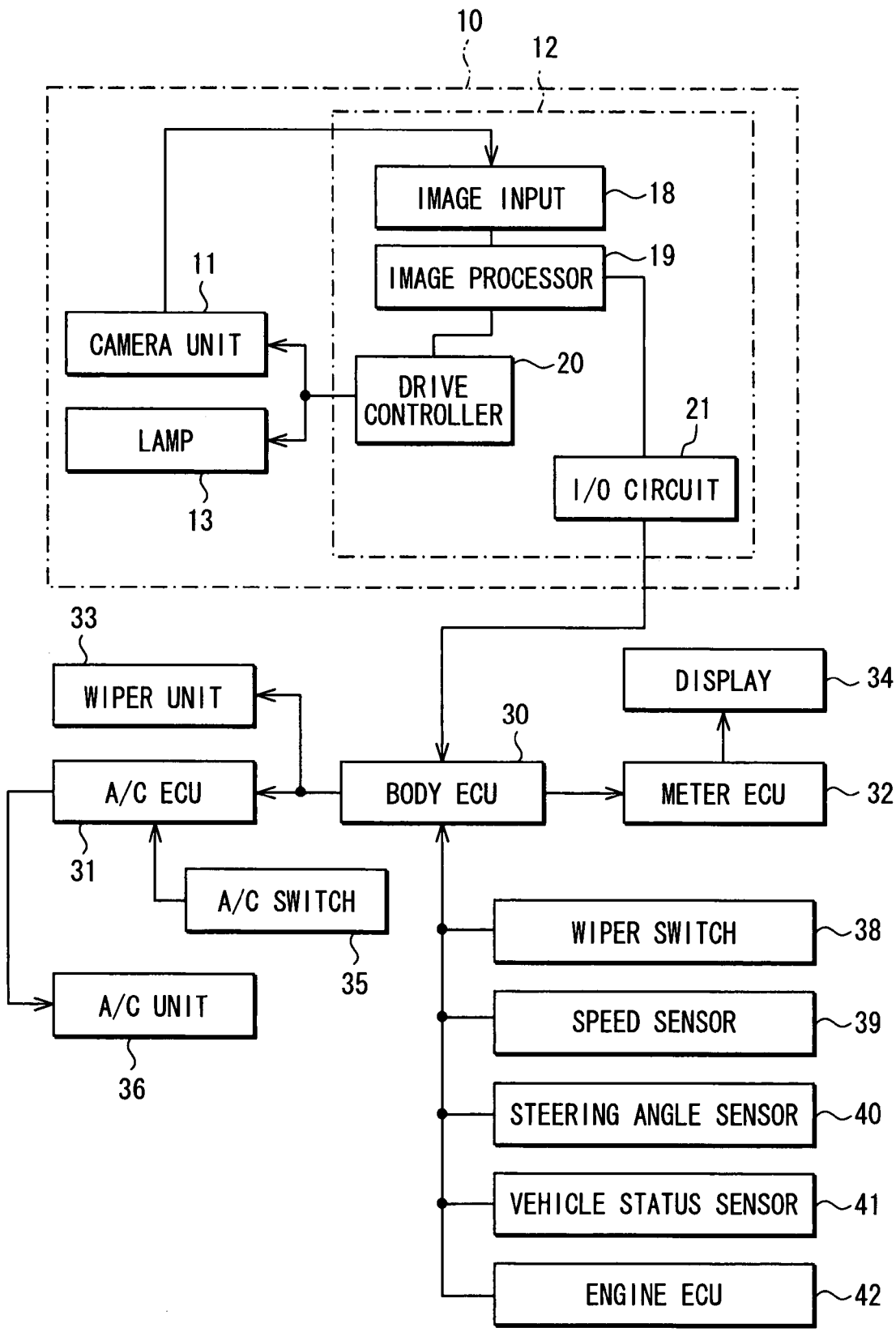
FIG. 1 is a block diagram of a vehicle control apparatus including a raindrop sensor and a wiper controller according to an embodiment of the present invention.

As shown in FIG. 1, a vehicle control apparatus according to one embodiment of the present invention includes a raindrop sensor 10, a body electronic control unit (ECU) 30, an air-conditioner (A/C) ECU 31, and a meter ECU 32.

The body ECU 30 is connected to a wiper unit 33, a wiper switch 38, a speed sensor 39, a steering angle sensor 40, a vehicle status sensor 41, and an engine ECU 42. The A/C ECU 31 is connected to an A/C switch 35, and an A/C unit 36. The meter ECU 32 is connected to a display 34 mounted to an instrument panel of a vehicle. The body ECU 30 is connected to each of the raindrop sensor 10, the A/C ECU 31, and the meter ECU 32.

Figure 2:
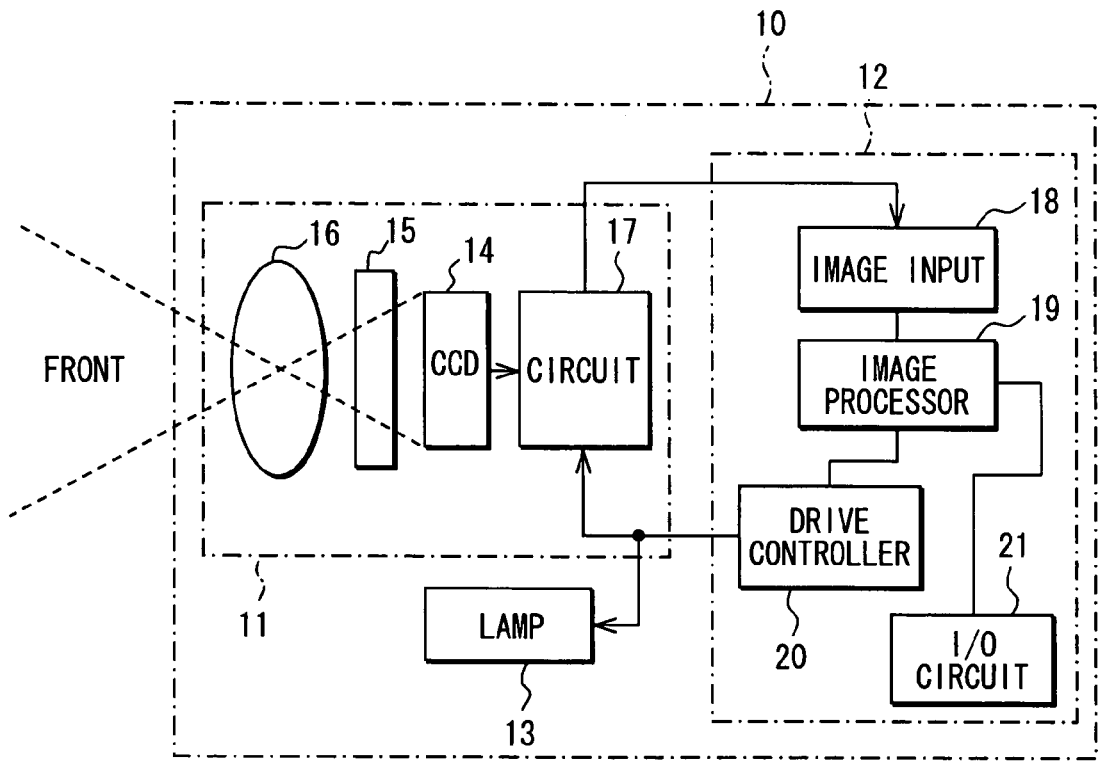
FIG. 2 is a block diagram of the raindrop sensor and the wiper controller of FIG. 1.

As shown in FIG. 2, the raindrop sensor 10 includes a camera unit 11, an image processing section 12, and a lamp 13.

The camera unit 11 includes an image sensor 14, an optical filter 15, an optical lens 16, and a circuit section 17. The image sensor 14 may be, for example, a charge-coupled device (CCD) image sensor or a complementary metal oxide semiconductor (CMOS) image sensor. The optical filter 15 may be, for example, a visible light cut filter, or a bandpass filter and allows passage of light having a wavelength within a predetermined range. The optical lens 16 gathers light. The circuit section 17 includes a power supply circuit, an analog-to-digital (A/D) converter, an amplifier circuit, a timing circuit, and the like. Under the control of the circuit section 17, the image sensor 14 captures an image.

The image processing section 12 includes an image input portion 18, an image processor 19, a drive controller 20, and an input/output (I/O) circuit 21. The image processor 19 includes a central processing unit (CPU) and analytically processes the image captured by the image sensor 14. The image input portion 18 acts as an interface between the circuit section 17 of the camera unit 11 and the image processor 19. The drive controller 20 controllably drives the lamp 13 and the image sensor 14. The lamp 13 emits near infrared light in a low light condition, such as at night or in shadow. As shown in FIG. 1, the image processor 19 is connected to the wiper unit 33 via the I/O circuit 21 and the body ECU 30 to drive the wiper unit 33.

Figure 3:
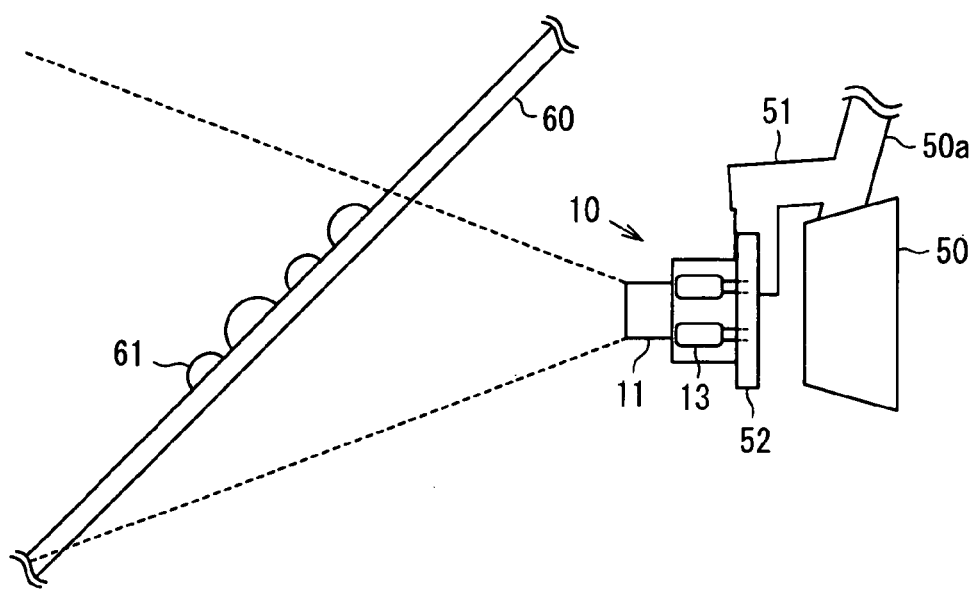
FIG. 3 is a view showing how the raindrop sensor and the wiper controller are mounted to a vehicle.

As shown in FIG. 3, the raindrop sensor 10 is integrated with an interior rear-view mirror 50 of the vehicle. The interior rear-view mirror 50 is fixed to a base arm 50a, and the base arm 50a branches to provide a support arm 51 extending behind the interior rear-view mirror 50. A support plate 52 is fixed to the support arm 51, and the camera unit 11 is mounted to the support plate 52. Thus, the support arm 51 supports the raindrop sensor 10 behind the interior rear-view mirror 50, so that the image sensor 14 of the camera unit 11 can capture the image of a road scene ahead of the vehicle from inside the vehicle through a front windshield 60 of the vehicle. The lamp 13 is also mounted to the support plate 52 and emits the near infrared light to the windshield 60 as required.

Figure 4A:
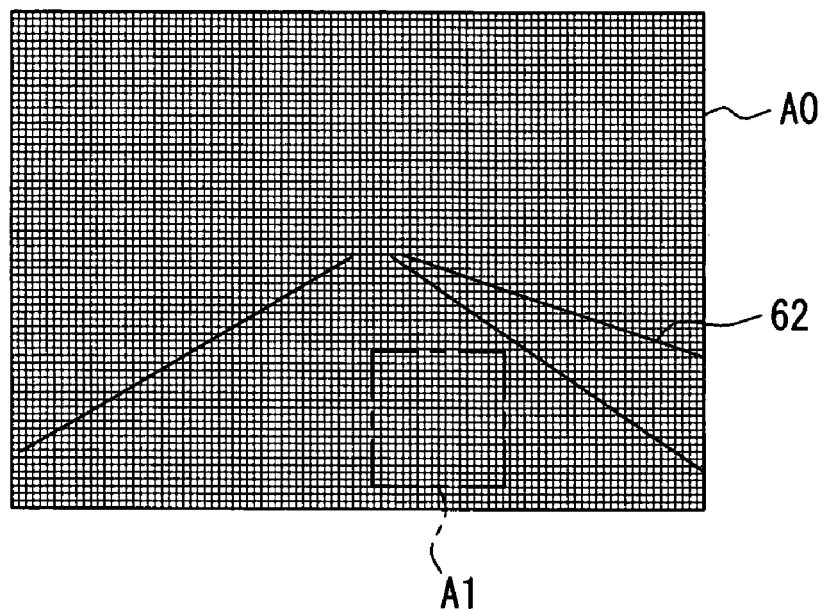
FIG. 4A is a view of an image captured by an image sensor of the raindrop sensor and the wiper controller.
Figure 4B:
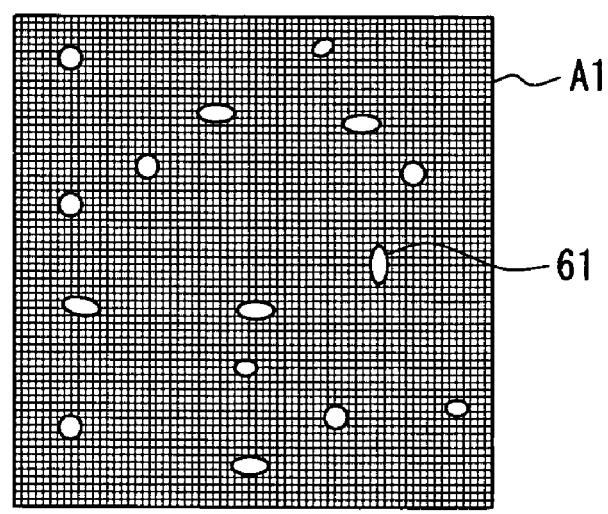
FIG. 4B is an enlarged view of a portion of FIG. 4A.

The image sensor 14 of the raindrop sensor 10 can be shared with a road monitoring system that detects a lane 62 and an oncoming vehicle. In the case where the image sensor 14 is shared with the road monitoring system, the image sensor 14 captures the image of a capture area A0 shown in FIG. 4A and the image processor 19 analyzes the image of a detection area A1 shown in FIG. 4B. As shown in FIG. 4A, the detection area A1 is part of the capture area A0. In contrast, in the case where the image sensor 14 is used only for the raindrop sensor 10, the image sensor 14 may capture the image of only the detection area A1.

Figure 5:
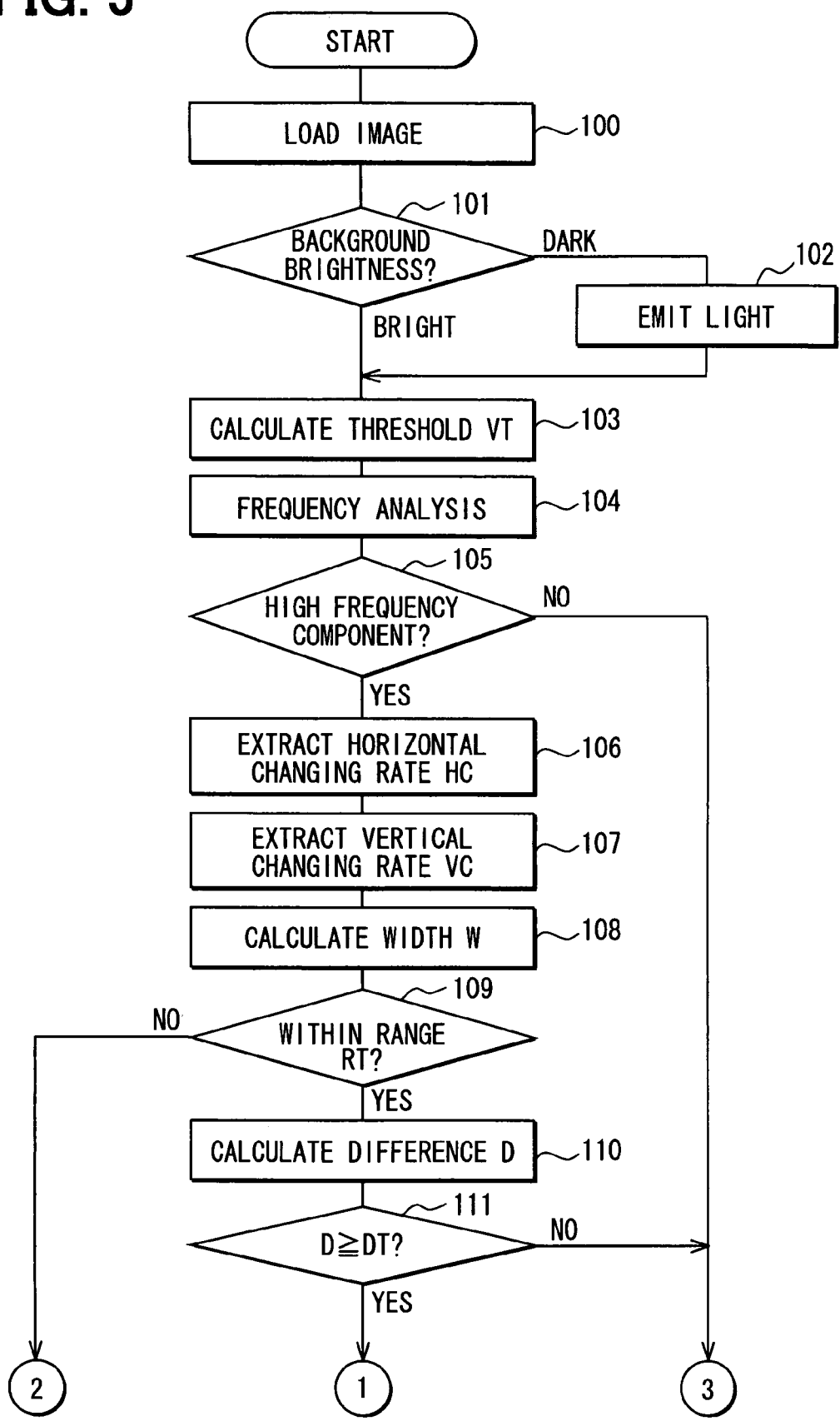
FIGS. 5 and 6 are flowcharts of a control process performed by the raindrop sensor and the wiper controller of FIG. 1.
Figure 6:
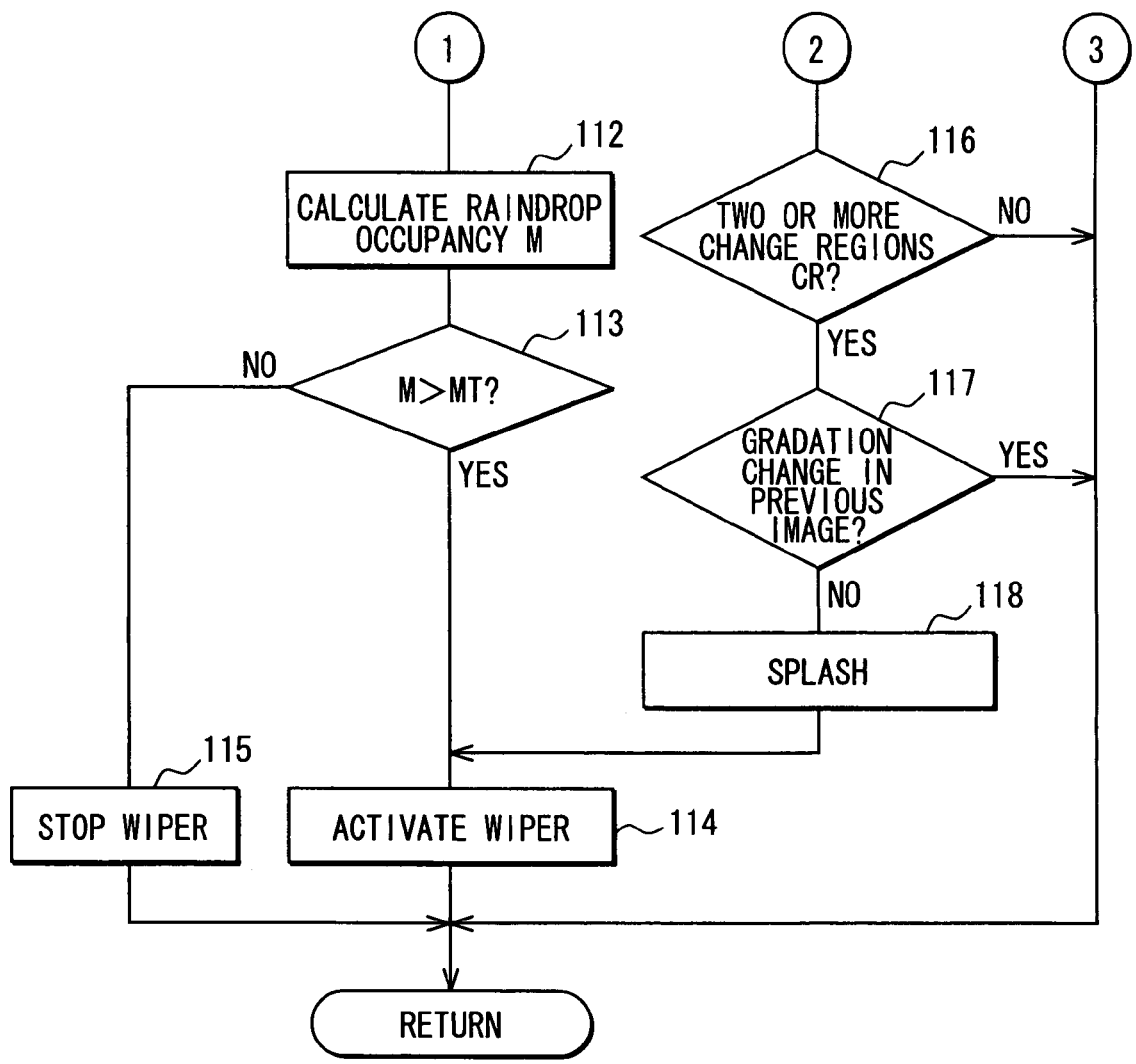

The raindrop sensor 10 performs a control process shown in the flowcharts of FIGS. 5 and 6. The control process starts with step 100, where the image processor 19 loads the image from the image input portion 18.

Then, the control process proceeds to step 101, where the image processor 19 determines whether a background of the image is bright or dark. If the background of the image is dark, the control process proceeds to step 103 by way of step 102, where the image processor 19 activates the lamp 13 so that the lamp 13 emits the near infrared light to the windshield 60. In contrast, if the background of the image is bright, the control process directly proceeds to step 103. Details are given later with reference to FIGS. 15A, 15B.

At step 103, the image processor 19 calculates a threshold VT. Details are given later with reference to FIGS. 9-14. Then, the control process proceeds to step 104, where the image processor 19 performs a frequency analysis of the image. Then, the control process proceeds to step 105, where the image processor 19 determines whether the image contains a high-frequency component.

Figure 7A:
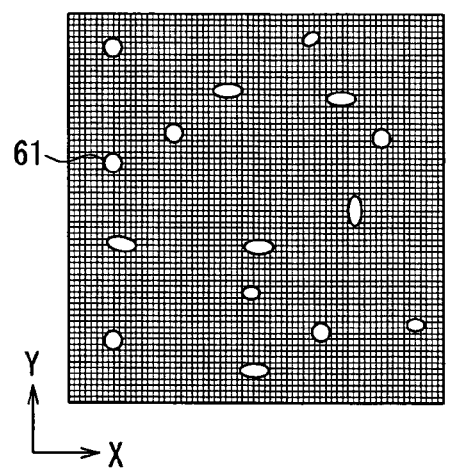
FIG. 7A is a view of an image captured by the image sensor when a raindrop is on a windshield.
Figure 7B:
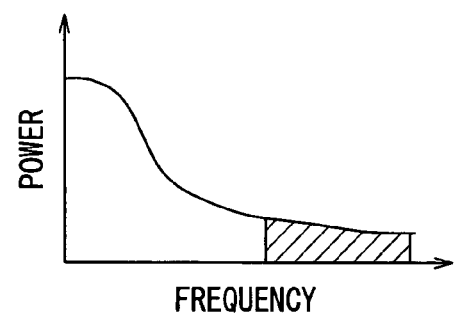
FIG. 7B is a graph showing a result of a frequency analysis of the image of FIG. 7A.
Figure 8A:
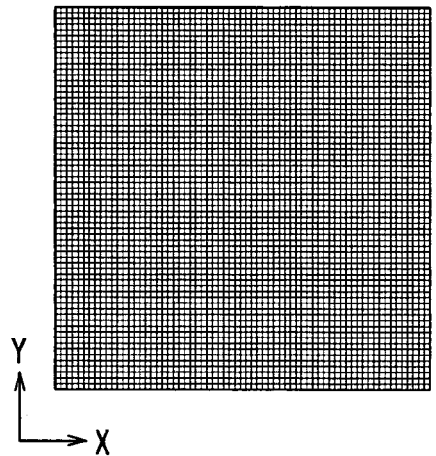
FIG. 8A is a view of an image captured by the image sensor when no raindrop is on the windshield.
Figure 8B:
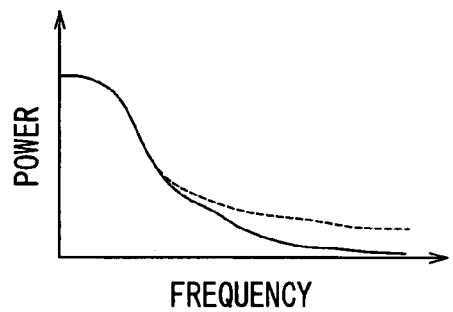
FIG. 8B is a graph showing a result of a frequency analysis of the image of FIG. 8A.

FIGS. 7A, 7B show the case where the raindrop 61 is on an exterior surface of the windshield 60, and FIGS. 8A, 8B show the case where no raindrop 61 is on the exterior surface of the windshield 60. As can be seen from the drawings, power of the image in a predetermined high frequency range is different between when the raindrop 61 is on the windshield 60 and when no raindrop 61 is on the windshield 60. Therefore, the image processor 19 determines, based on the power in the predetermined high frequency range, whether the image contains the high-frequency component. In short, the image processor 19 determines, based on the power in the predetermined high frequency range, whether the raindrop 61 is on the windshield 60.

If the high-frequency component is detected at step 105, the control process proceeds to step 106. In contrast, if the high-frequency component is not detected at step 105, the control process returns to step 100.

Figure 9:
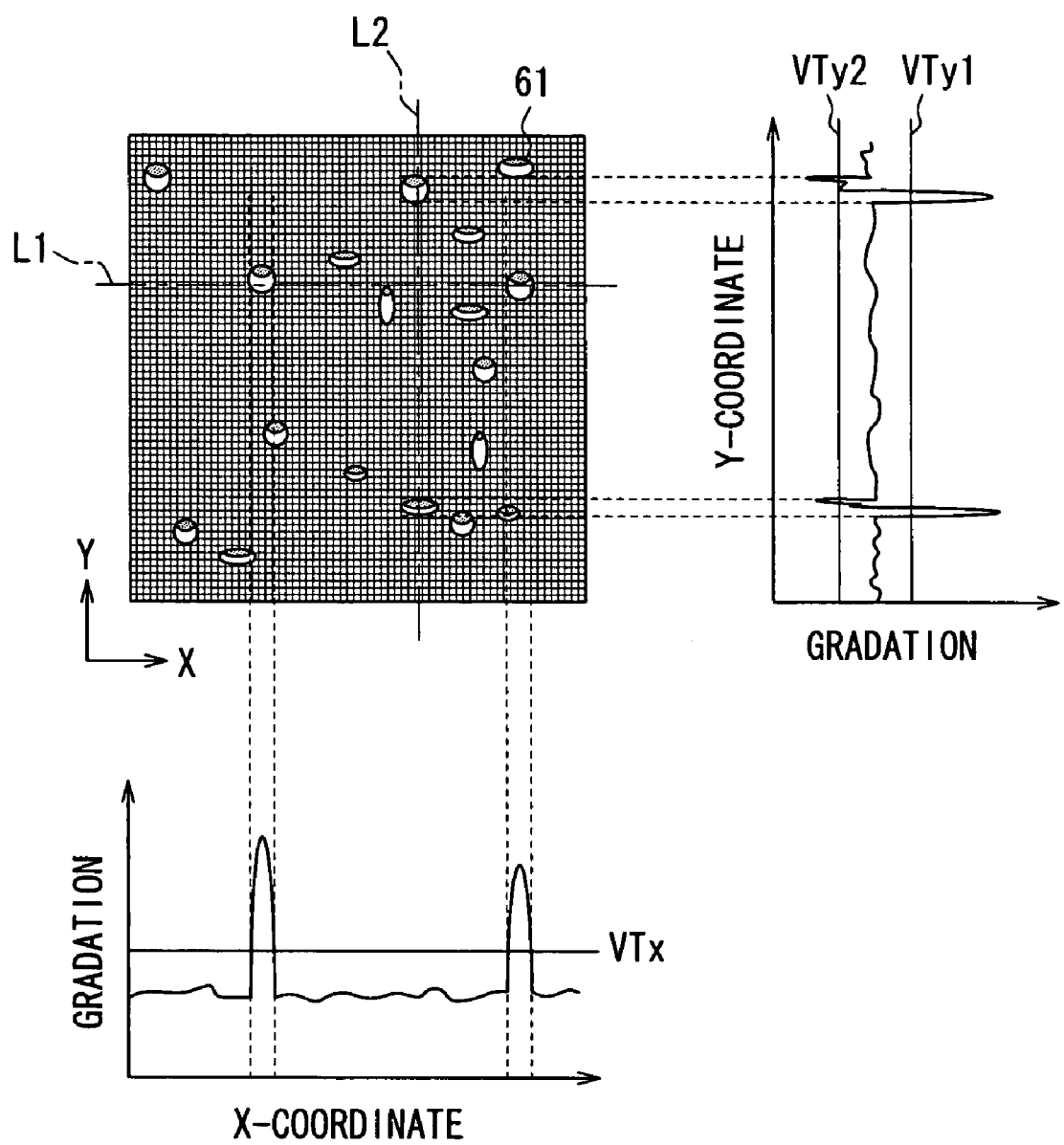
FIG. 9 is a graph showing a change in gradation of the image captured by the image sensor when the raindrop is on a windshield.
Figure 10:
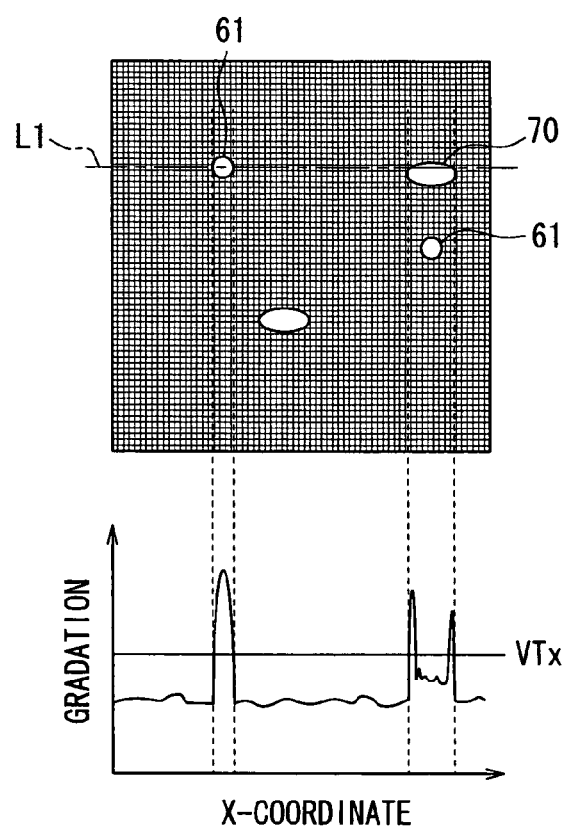
FIG. 10 is a graph showing a change in gradation of the image captured by the image sensor in low light condition.
Figure 11:
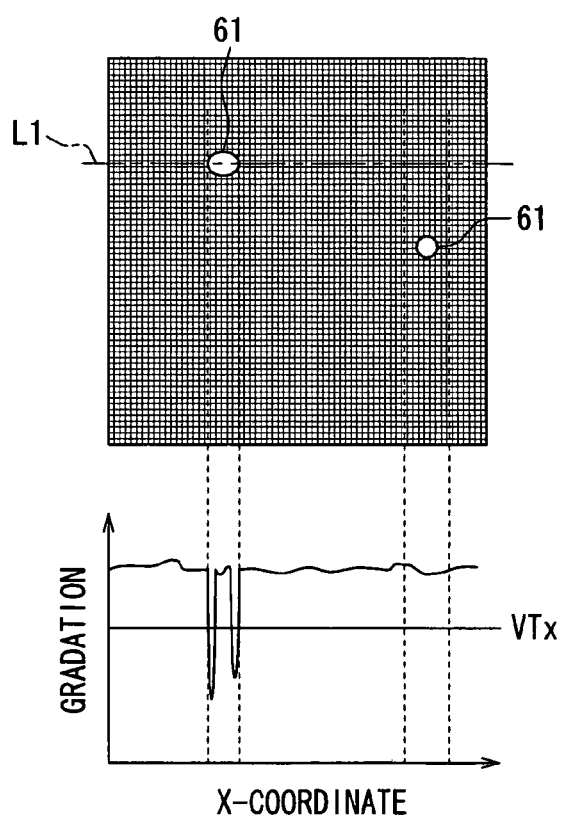
FIG. 11 is a graph showing a change in gradation of the image captured by the image sensor in high light condition.
Figure 12:
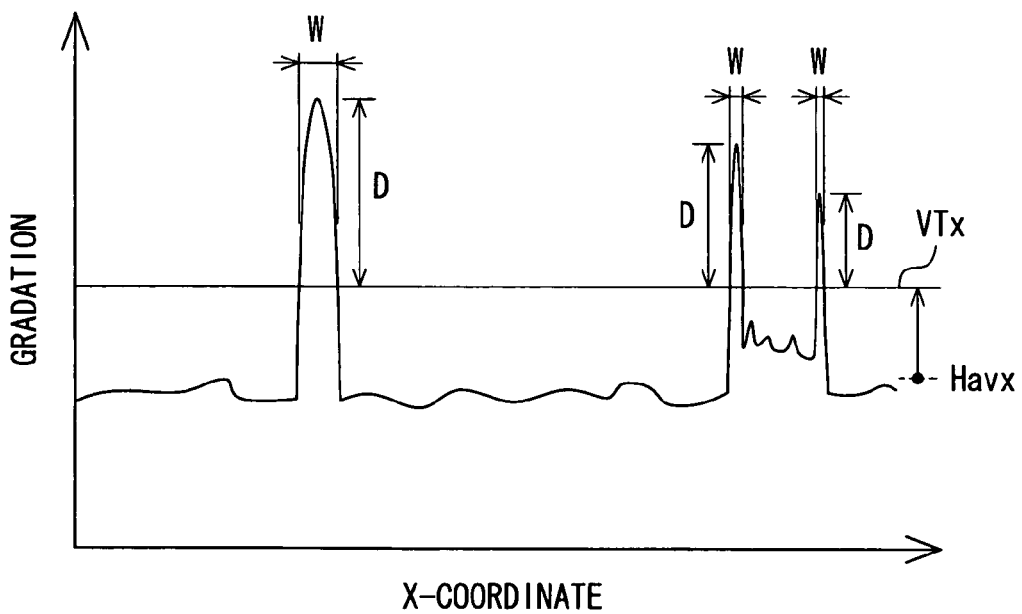
FIG. 12 is a detail view of a portion of FIG. 10.
Figure 13:
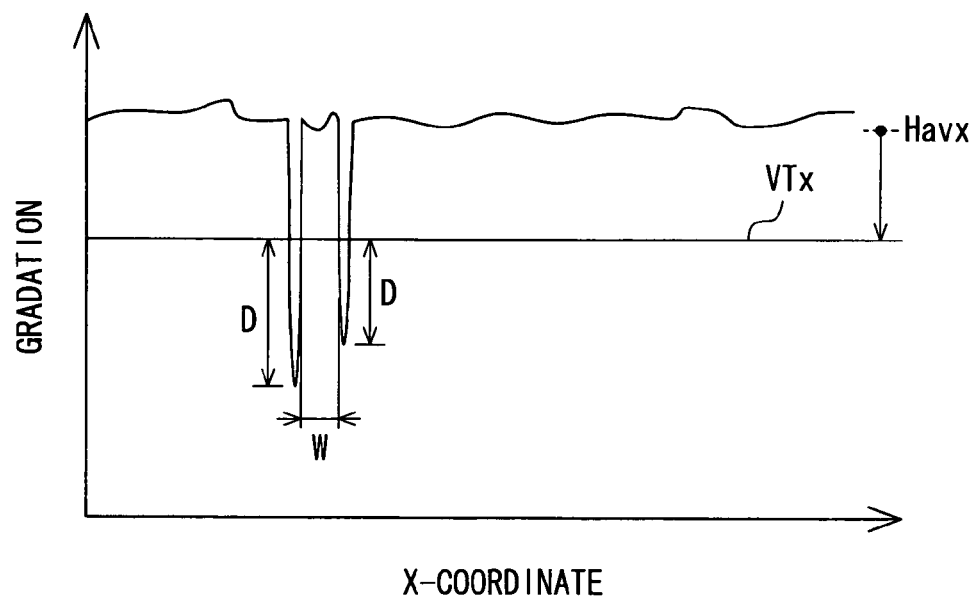
FIG. 13 is a detail view of a portion of FIG. 11.
Figure 14:
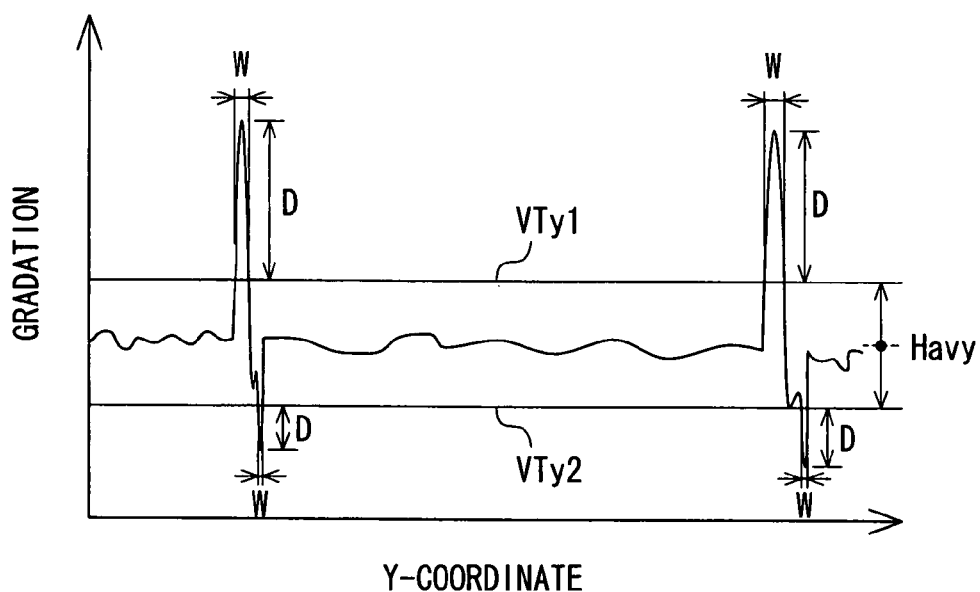
FIG. 14 is a detail view of a portion of FIG. 9.

At step 106, the image processor 19 extracts a horizontal changing rate HC in gradation of the image at a horizontal line L1 shown in FIG. 9. Then, the control process proceeds to step 107 where the image processor 19 extracts a vertical changing rate VC in gradation of the image at a vertical line L2 shown in FIG. 9.

Then the control process proceeds to step 108, where the image processor 19 calculates a width W of a change region CR where the gradation of the image changes. The width W is defined by a distance between intersections of a gradation graph exceeding the threshold VT and a line of the threshold VT.

The threshold VT has a horizontal threshold VTx and first and second vertical thresholds VTy1, VTy2. The first vertical threshold VTy1 is calculated by adding a predetermine value to a vertical average gradation Havy of the image, and the second vertical threshold VTy2 is calculated by subtracting the predetermine value from the vertical average gradation Havy. When a horizontal average gradation Havx of the image is less than a predetermined level, the horizontal threshold VTx is calculated by adding a predetermine value to the horizontal average gradation Havx. In contrast, when the horizontal average gradation Havx is greater than the predetermined level, the horizontal threshold VTx is calculated by subtracting the predetermine value from the horizontal average gradation Havx.

After the step 108, the control process proceeds to step 109, where the image processor 19 determines whether the width W of the change region CR is within a predetermined range RT. The range RT corresponds to a diameter of the raindrop 61 and ranges from approximately 1 millimeter (mm) to approximately 10 mm, for example.

When the raindrop 61 is on the windshield 60 as shown in FIG. 3, the image sensor 14 captures the image shown in FIG. 9. A sudden change in gradation of the image occurs at an outline of the raindrop 61. The sudden change in gradation appears as the high-frequency component in the image as a result of the frequency analysis. Therefore, the presence of the raindrop 61 on the windshield 60 may be detected based on the presence of the high-frequency component in the image.

However, as with the raindrop 61, a foreign matter such as a water stain 70 on the windshield 60 may cause the sudden change in gradation of the image. Therefore, in the case where the detection of the raindrop 61 relies on only the presence of high-frequency component, the raindrop sensor 10 may incorrectly detect the foreign matter as the raindrop 61.

As described below, the change in gradation of the image is different between the raindrop 61 and the foreign matter. The change in gradation of the image occurs over the whole portion of the raindrop 61, because the raindrop 61 acts as a lens. In contrast, the change in gradation of the image occurs only at the outline portion of the foreign matter like a surge. Therefore, the raindrop 61 and the foreign matter can be distinguished based on the width W of the change region CR, where the gradation of the image changes. Specifically, when the width W of the change region CR is within the range RT, the raindrop sensor 10 determines that the high-frequency component results from the raindrop 61. Thus, the foreign matter and the raindrop 61 can be distinguished based on the width W of the change region CR. Although the width W depends on the threshold VT, the threshold VT is set according to the average gradation of the image. In such an approach, even when the background of the image is too bright due to backlight or a white wall, the threshold VT is appropriately set so that the foreign matter and the raindrop 61 can be distinguished based on the width W.

Figure 15A:
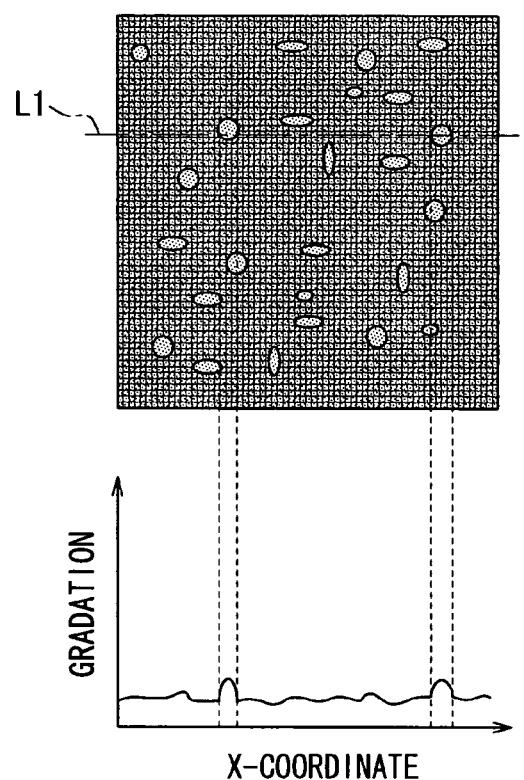
FIG. 15A is a graph showing a change in gradation of the image captured by the image sensor in very low light condition.
Figure 15B:
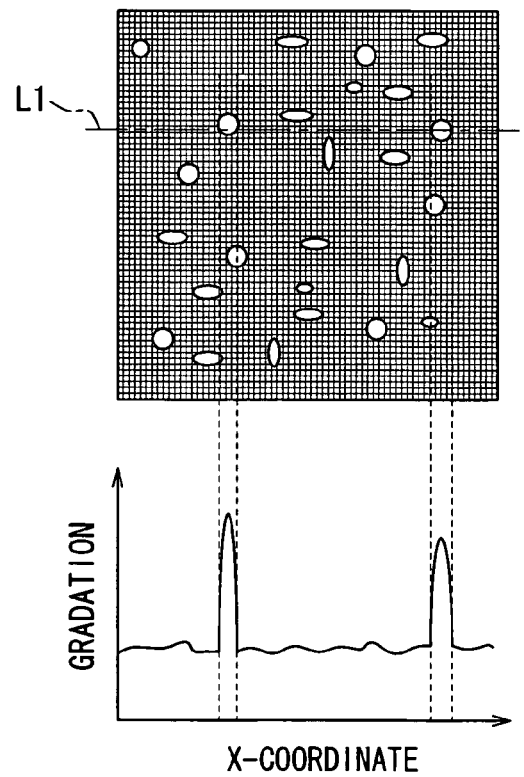
FIG. 15B is a view of FIG. 15A after a near infrared light is emitted to the windshield.

When the background of the image is dark as shown in FIG. 15A, the lamp 13 emits the near infrared light to the windshield 60 at step 102. As a result, the background of the image becomes bright as shown in FIG. 15B. Specifically, the average gradation (i.e., Havx, Havy) of the image is calculated at step 101, and the lamp 13 is activated at step 102 if the average gradation is less than a threshold value. The lamp 13 emits pulsed light synchronously with the exposure of the image sensor 14.

Return to the flowchart of FIG. 5, if the image processor 19 determines that the width W is within the predetermined range RT at step 109, the control process proceeds to step 110. At step 110, the image processor 19 calculates a difference D between the threshold value VT (i.e., VTx, VTy1, VTy2) and a peak value (i.e., amount) of the change in gradation within the change region CR. Therefore, the difference D depends on the peak value of the change in gradation within the change region CR.

Then, the control process proceeds to step 111, where the image processor 19 determines whether the difference D is equal to or greater than a predetermined difference value DT.

If the difference D is equal to or greater than the predetermined difference value DT, the image processor 19 determines that the raindrop 61 is on the windshield 60.

Then, the control process proceeds to step 112, where the image processor 19 calculates occupancy (i.e., amount) M of the raindrop 61 on the windshield 60. If the occupancy M of the raindrop 61 is calculated based on the number of the raindrops 61, the occupancy M of the raindrop 61 may deviate from the driver's sense of visibility. Therefore, a total area covered by the raindrop 61 is calculated from the width W and the occupancy M of the raindrop 61 is calculated based on a proportion of the calculated total area to the detection area A1.

Then, the control process proceeds to step 113, where the image processor 19 determines whether the occupancy M of the raindrop 61 is greater than a predetermined occupancy (i.e., amount) MT. If the occupancy M of the raindrop 61 is greater than the predetermined occupancy MT, the control process proceeds to step 114, where the image processor 19 activates the wiper unit 33. In contrast, if the occupancy M of the raindrop 61 is less than the predetermined occupancy MT, the control process proceeds to step 115, where the image processor 19 stops the wiper unit 33.

Figure 17:
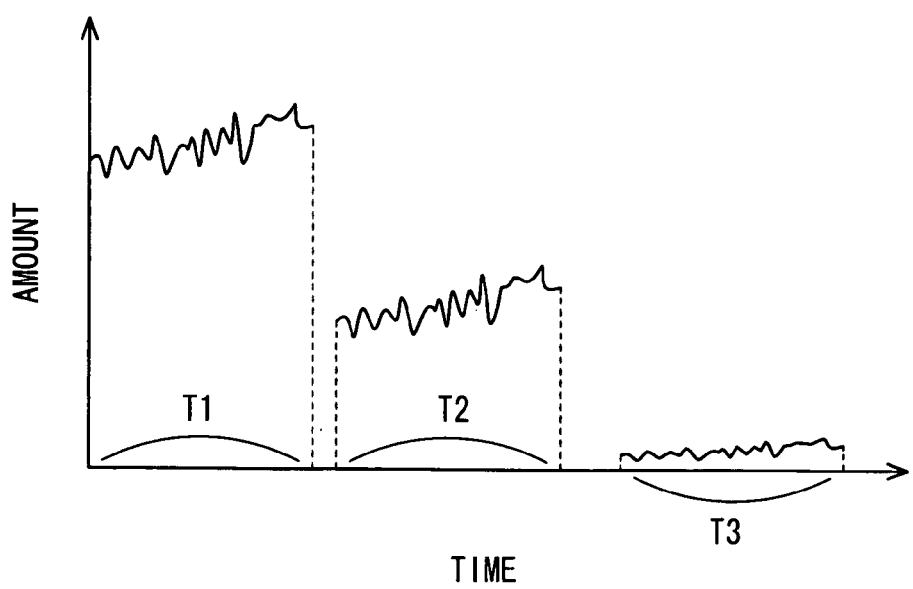
FIG. 17 is a graph showing how the amount of the raindrop changes with time.

The wiper unit 33 has a continuous mode and an intermittent mode. In the continuous mode, the wiper unit 33 operates continuously. In the intermittent mode, the wiper unit 33 operates intermittently. The intermittent mode may have a high mode with a maximum intermittent period, a low mode with a minimum intermittent period, and a middle mode with a middle intermittent period between the maximum and minimum intermittent periods. At step 114, the wiper unit 33 is switched between the continuous mode and the intermittent mode in accordance with the amount of the raindrop 61. It may be determined whether the occupancy M of the raindrop 61 increases or decreases with time, based on a difference between a previous image captured at a previous time and a present image captured at a present time. If it is determined that the occupancy M of the raindrop 61 increases with time, the wiper unit 33 may be switched to the continuous mode. In contrast, if it is determined that the occupancy M of the raindrop 61 decreases with time, the wiper unit 33 may be switched to the intermittent mode. Alternatively, if it is determined that the occupancy M of the raindrop 61 decreases with time, the speed of the wiper unit 33 may be reduced. For example, in the case of FIG. 17, the wiper unit 33 operates in the continuous mode during a first time period T1, operates in the intermittent mode during a second time period T2, and stops its operation during a third time period T3.

Return to the flow chart of FIG. 5, if the image processor 19 determines that the width W is outside the predetermined range RT at step 109, the control process proceeds to step 116 shown in FIG. 6. At step 116, the image processor 19 determines whether there are at least two change regions CR and each of at least two of the change regions CR has the width W outside the predetermined range RT. If the image processor 19 determines that there are at least two change regions CR and each of at least two of the change regions CR has the width W outside the predetermined range RT, the control process proceeds to step 117. At step 117, the image processor 19 compares the previous image captured at the previous time with the present image captured at the present time. If the image processor 19 determines that the change in gradation does not occur in the previous image, the control process proceeds to step 118. At step 118, the image processor 19 determines that the high-frequency component in the present image results from a splash from, for example, a passing vehicle. Then, the control process proceeds to step 114, where the wiper unit 33 is activated and switched to the continuous mode.

Figure 16A:
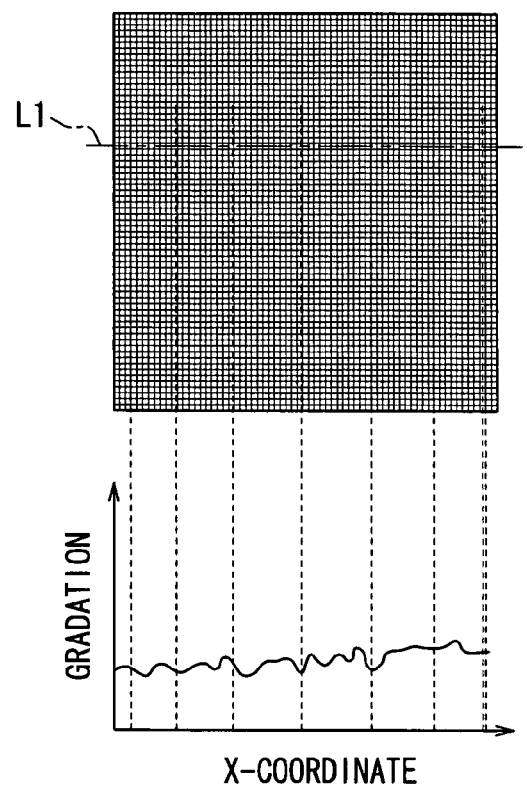
FIG. 16A is a graph showing a change in gradation of the image captured by the image sensor when no splash is on the windshield.
Figure 16B:
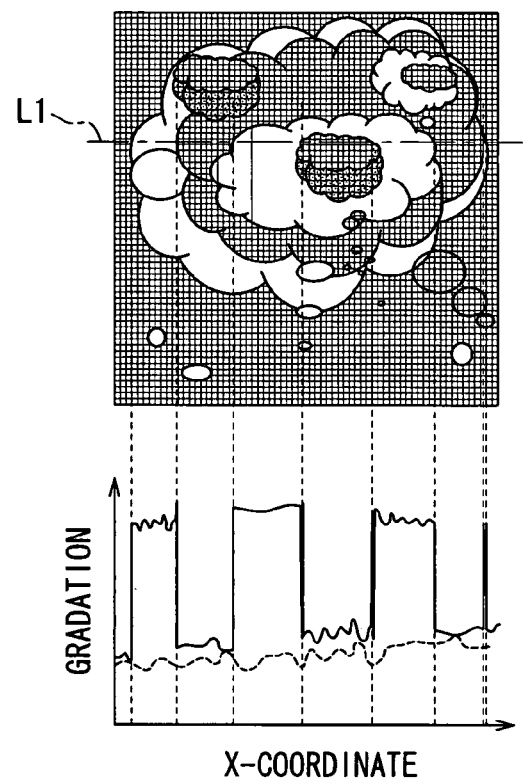
FIG. 16B is a graph showing a change in gradation of the image captured by the image sensor when a splash is on the windshield.

Steps 116-118 are described in detail with reference to FIGS. 16A, 16B. FIG. 16A shows the previous image captured at the previous time, and FIG. 16B shows the present image captured at the present time. As can be seen by comparing FIG. 16A and FIG. 16B, while there is no splash on the windshield 60 at the previous time, there is the splash on the windshield at the present time. Accordingly, while there is no change in gradation in the previous image, there is the change in gradation in the present image. Since the width W of the change region CR is outside the predetermined range RT, the image processor 19 determines that the high-frequency component in the present image does not result from the raindrop 61. Further, since there are at least two change regions CR and each of at least two of the change regions CR has the width W outside the predetermined range RT, the image processor 19 determines that the high-frequency component results from the splash. Then, the image processor 19 determines that the windshield 60 is covered with water by the splash and visibility is poor. Thus, the image processor 19 switches the wiper unit 33 to the continuous mode to immediately improve the visibility.

For example, the size of the capture area A0 is 640×480 pixels corresponding to Video Graphics Array (VGA) size. The whole of the capture area A0 may be used as the detection area A1. If the image sensor 14 cannot focus on the whole capture area A0, a portion of the capture are A0 where the image sensor 14 can focus on is used as the detection area A1. In this case, the size of the detection area A1 may be, for example, 100×100 pixels, i.e., 50 mm×50 mm. A processing load to analyze the image can be reduced by reducing the size of the detection area A1.

The detection area A1 may be set on the driver's side of the capture area A0. For example, when a driver's seat is on the left side of the vehicle, the detection area A1 is set on the left side of the capture area A0. In such an approach, the driver sees the detection area A1 while driving so that the detection result can be close to the sense of the driver. Further, the detection area A1 may be set on the lower side of the capture area A0. In such an approach, the distance between the capture area A0 and the image sensor 14 can be increased so that the image sensor 14 can easily focus on the capture area A0. Further, when the detection area A1 is set on the lower side of the capture area A0, the lane 62 and the oncoming vehicle can be easily detected so that the image sensor 14 can be shared with the road monitoring system. Alternatively, a wiper sweep area of the wiper unit 33 may define the detection area A1.

Returning to FIG. 3, if the interior rear-view mirror 50 is mounted very close to the windshield 60, the image sensor 14 may not focus on the windshield 60. In this case, a variable-focus lens, whose focal length can be varied, may be used as the lens 16. By using the variable-focus lens, the image sensor 14 may focus on between the windshield 60 and infinity alternately at intervals (frames) at which the image sensor 14 captures the image. For example, the variable focus lens may include two different lenses, one of which is a short focal length lens and the other of which is a long focal length lens. Alternatively, the variable focus lens may include a motor for changing a lens position. Alternatively, to reduce the size or to eliminate mechanical moving parts of the lens 16, the variable focus lens may be a liquid crystal lens or a liquid lens, whose focal length can be varied by means of electricity.

Thus, the raindrop sensor 10 captures the image of the windshield 60 by using the image sensor 14 and detects the raindrop 61 on the windshield 60 by analyzing the captured image. The wiper unit 33 is controlled according to the result of the detection. The raindrop 61, the water stain 70, the splash can be distinguished based on the width W of the change region CR, where the gradation of the image changes. Further, the occupancy M of the raindrop 61 on the windshield 60 can be detected based on the width W, the difference D, and the difference between the previous and present images. The wiper unit 33 can be controlled in accordance with the occupancy M of the raindrop 61 to immediately improve the visibility.

In the image processing system disclosed in US 2006/0243894A1, the lamp needs to be mounted to the vehicle such that the light reflected by the foreign matter on the windshield enters the image sensor. Therefore, the size of the image processing system may be increased due to the lamp. Separating the lamp from the image processing system can reduce the size of the image processing system. However, in this case, the lamp needs to be mounted on, for example, a dashboard so that mountability of the image processing system to the vehicle is reduced. Further, when the image sensor captures the road scene ahead of the vehicle, noise such as sunlight enters the image sensor. Therefore, the lamp needs to emit high-power light to improve signal (i.e., light emitted by the lamp) to noise (i.e., sunlight) ratio. To emit the high-power light, the lamp needs many light emitting devices such as light emitting diodes (LED). As a result, the size of the lamp may be increased.

In contrast, in this embodiment, the lamp 13 does not need to emit the high-power light, because the lamp 13 is used only when the background of the image is dark, i.e., only in the low light condition, such as at night or in shadow. Therefore, the lamp 13 can be constructed with a reduced number of the light emitting devices so that the size of the lamp 13 can be reduced. Further, since the lamp 13 is used only in the low light condition, the sunlight does not enter the image sensor 14. Therefore, the reduction in signal to noise ratio due to the sunlight can be reduced. Further, since the lamp 13 is integrated in the raindrop sensor 10, the raindrop sensor 10 has good mountability to the vehicle compared to the image processing system disclosed in US 2006/0243894A1.

In the raindrop sensor 10 according to the embodiment, the image sensor 14 captures the image of the windshield 60 and the image processor 19 performs the frequency analysis of the image captured by the image sensor 14 to detect the high-frequency component in the image. In the case where the high-frequency component is detected, the image processor 19 determines whether the width W of the change region CR, where the gradation of the image changes, is within the predetermined range RT corresponding to the diameter of the raindrop 61. When the width W is within the predetermined range RT, the image processor 19 determines that the high-frequency component in the image results from the raindrop 61. In such an approach, even when the foreign matter such as the water stain 70 appears as the high-frequency component as the result of the frequency analysis, the raindrop sensor 10 can accurately distinguish between the raindrop 61 and the foreign matter. Thus, the raindrop sensor 10 can accurately detect the raindrop 61 on the windshield 60. Unlike the image processing system disclosed in US 2006/0243894A1, there is no need that the windshield 60 is water-repellent and the raindrop 61 is round like a ball. Further, the image processor 19 detects the occupancy M of the raindrop 61 and controls the wiper unit 33 in accordance with the occupancy M of the raindrop 61.

Specifically, the outline of the raindrop 61 or the foreign matter causes the sudden change in gradation of the image.

The sudden change appears as the high-frequency component as the result of the frequency analysis. Therefore, the image processor 19 performs the frequency analysis of the image to detect the high-frequency component, i.e., the raindrop 61 or the foreign matter.

The change in gradation of the image is different between the raindrop 61 and the foreign matter. The change in gradation of the image occurs over the whole portion of the raindrop 61, because the raindrop 61 acts as the lens. In contrast, the change in gradation of the image occurs only at the outline portion of the foreign matter like a surge. Therefore, the raindrop 61 and the foreign matter can be distinguished based on the width W (i.e., the number of pixels of the image) of the change region CR, where the gradation of the image changes. When the width W of the change region CR is within the predetermined range RT (e.g., between approximately 1 mm and approximately 10 mm) corresponding to the diameter of the raindrop 61, the raindrop sensor 10 determines that the high-frequency component in the image results from the raindrop 61. In such an approach, the raindrop sensor 10 can accurately distinguish between the raindrop 61 and the foreign matter.

Further, the image processor 19 calculates the difference D between the threshold value VT (i.e., VTx, VTy1, VTy2) and the peak value of the change in gradation within the change region CR. When the difference D is equal to or greater than the predetermined difference value DT, the image processor 19 determines that the raindrop 61 is on the windshield 60. Thus, the image processor 19 determines whether the raindrop 61 is on the windshield 60 based on the presence of the high-frequency component, the width W of the change region CR, and the difference D. Therefore, the image processor 19 can surely and accurately detect the raindrop 61 on the windshield 60.

Further, the image processor 19 determines that the high-frequency component results from the splash and activates the wiper unit 33 to wipe off the windshield 60, when it is detected that there are at least two change regions CR in the present image not in the previous image and each of at least two of the change regions CR has the width W outside the predetermined range RT. In such an approach, even when the windshield 60 is covered with water by the splash, the wiper unit 33 wipes the splash from the windshield 60 so that the visibility can be immediately improved.

Further, the image processor 19 calculates the average gradation (i.e., Havx, Havy) of the image. When the average gradation of the image is less than the threshold value, the image processor 19 determines that the vehicle is in the low light condition and activates the lamp 13 so that the lamp 13 emits the near infrared light to the windshield 60. In such an approach, the image sensor 14 can accurately capture the image of the windshield 60 even in the low light condition, so that the raindrop sensor 10 can accurately detect the raindrop 61 based on the image captured by the image sensor 14.

The image sensor 14 is provided with the optical filter 15 such as the visible light cut filter, the bandpass filter, or the like. The optical filter 15 allows passage of light having the wavelength within the predetermined range. Specifically, while the optical filter 15 allows passage of the near infrared light emitted by the lamp 13 to the image sensor 14, the optical filter 15 prevents passage of the noise such as the sunlight to the image sensor 14. Thus, the optical filter 15 reduces influence of the noise on the image sensor 14.

The image sensor 14 can be shared with the road monitoring system for detecting the lane 62 and the oncoming vehicle through the windshield 60. Thus, the raindrop sensor 10 can be simplified. In the case where the image sensor 14 is shared with the road monitoring system, the whole of the capture area A0 may be used as the detection area A1. If the image sensor 14 cannot focus on the whole capture area A0, the part of the capture are A0 where the image sensor 14 can focus on is used as the detection area A1. The detection area A1 may be set on the driver's side of the capture area A0. For example, when the driver's seat is on the left side of the vehicle, the detection area A1 is set on the left side of the capture area A0. In such an approach, the driver can see the detection area A1 while driving so that the detection result can be close to the sense of the driver. Further, the detection area A1 may be set on the lower side of the capture area A0. In such an approach, the distance between the capture area A0 and the image sensor 14 can be increased so that the image sensor 14 can easily focus on the capture area A0. Further, when the detection area A1 is set on the lower side of the capture area A0, the lane 62 and the oncoming vehicle can be easily detected so that the image sensor 14 can be shared with the road monitoring system. When the image sensor 14 is shared with the road monitoring system, it is preferable that the wiper sweep area of the wiper unit 33 defines the detection area A1, i.e., the wiper sweep area is included in the detection area A1.

The variable-focus lens capable of focusing from the windshield 60 to infinity may be used as the lens 16. The variable-focus lens can focus from the windshield 60 to infinity. By using the variable-focus lens, the image sensor 14 can focus on between the windshield 60 and infinity alternately at intervals (frames) at which the image sensor 14 captures the image. In the image captured at one time, while the outline of the raindrop 61 appears clearly, the road scene ahead of the vehicle appears blurred. Thus, the outline of the raindrop 61 is enhanced so that the raindrop sensor 10 can accurately detect the raindrop 61 on the windshield 60. In contrast, in the image captured at the other time, while the outline of the raindrop 61 appears blurred, the road scene ahead of the vehicle appears clearly. Therefore, the image sensor 14 can be shared with the road monitoring system. For example, the variable focus lens may be the liquid crystal lens or the liquid lens, whose focal length can be controlled by means of electricity, i.e. an electric voltage or an electric current. By using the liquid crystal lens or the liquid lens as the lens 16, the mechanical moving parts of the lens 16 can be eliminated so that the size of the lens 16 can be reduced.

(Modifications)

Figure 18A:
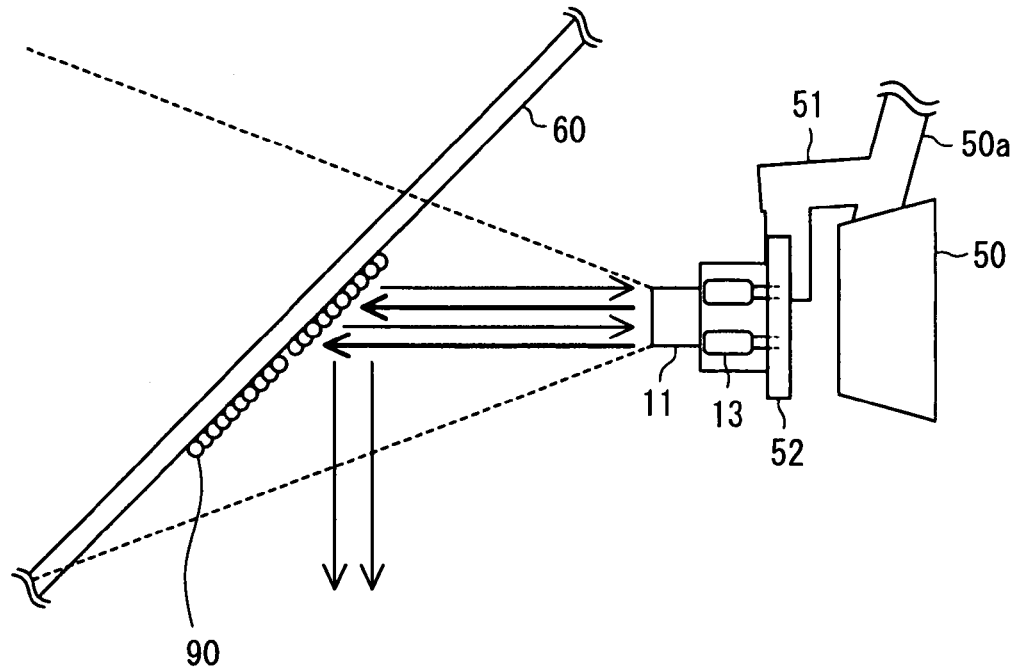
FIGS. 18A and 18B are views showing a raindrop sensor according to a modification of the embodiment.
Figure 18B:
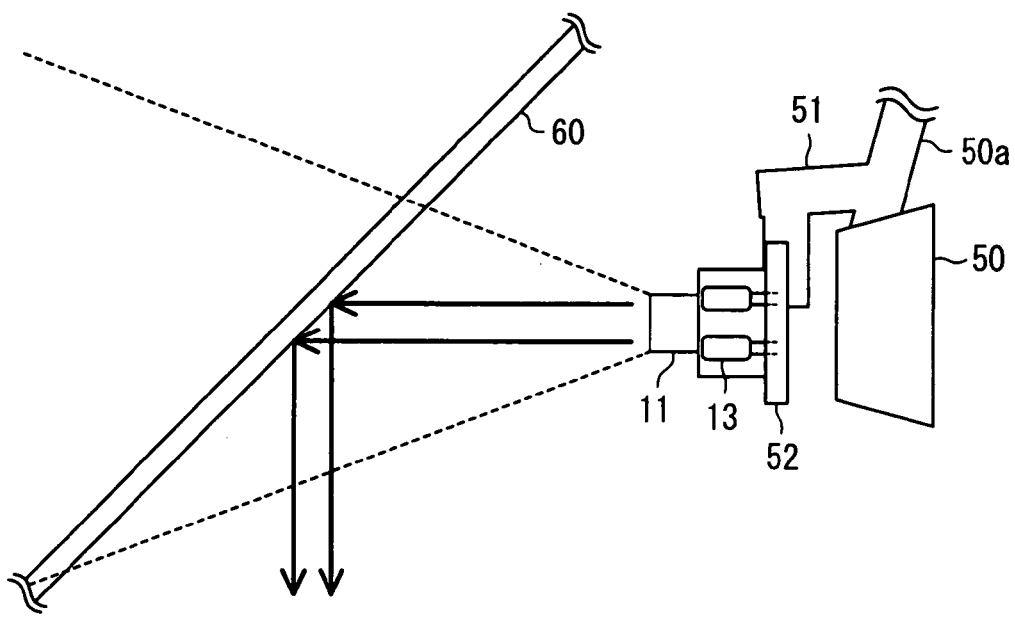

The embodiments described above may be modified in various ways. For example, in addition or instead of the raindrop 61 on the exterior surface of the windshield 60, the raindrop sensor 10 may detect a fogging (i.e., condensation) 90 on an interior surface of the windshield 60. As shown in FIG. 18B, when no fogging 90 is on the interior surface of the windshield 60, the light emitted by the lamp 13 is reflected by the windshield 60 downward so that the amount of the light received by the image sensor 14 is relatively small. In contrast, as shown in FIG. 18A, when the fogging 90 is on the interior surface of the windshield 60, the light emitted by the lamp 13 is diffusely reflected so that a portion of the light enters the image sensor 14 of the camera unit 11. As a result, the amount of the light received by the image sensor 14 is increased and there is a difference in the amount of the light received by the image sensor 14 between when the fogging 90 is on the interior surface of the windshield 60 and no fogging 90 is on the interior surface of the windshield 60. Therefore, the raindrop sensor 10 can detect the fogging 90 based on the amount of the light received by the image sensor 14.

Alternatively, the lamp 13 may be separated from the camera unit 11 and mounted below the windshield 60. In this case, when no fogging 90 is on the interior surface of the windshield 60, the light emitted by the lamp 13 is reflected by the windshield 60 toward the image sensor 14 so that the amount of the light received by the image sensor 14 is relatively large. In contrast, when the fogging 90 is on the interior surface of the windshield 60, the light emitted by the lamp 13 is diffusely reflected so that only the portion of the light enters the image sensor 14 of the camera unit 11. As a result, the amount of the light received by the image sensor 14 is reduced and there is the difference in the amount of the light received by the image sensor 14 between when the fogging 90 is on the interior surface of the windshield 60 and no fogging 90 is on the interior surface of the windshield 60. Therefore, the raindrop sensor 10 can detect the fogging 90 based on the amount of the light received by the image sensor 14.

The A/C unit 36 shown in FIG. 1 may be automatically turned on or switched to a defrost mode, when the raindrop sensor 10 detects the fogging 90 on the interior surface of the windshield 60. In such an approach, the fogging 90 is immediately reduced so that the visibility can be improved.

Such changes and modifications are to be understood as being within the scope of the present invention as defined by the appended claims.

What is claimed is:

1. A wiper controller for controlling a windshield wiper of a vehicle, the wiper controller comprising:

capturing means for capturing an image of a windshield of the vehicle from inside the vehicle;

high-frequency component determination means for performing a frequency analysis of the image and for determining based on a result of the frequency analysis whether the image has a high-frequency component;

gradation change detection means that operates when the image has the high-frequency component to detect a width of a change region in which a rate of change in intensity of the image exceeds a predetermined threshold;

raindrop determination means determining that the raindrop is on the windshield when the width of the change region is within a predetermined range corresponding to a diameter of the raindrop;

control means for controlling the windshield wiper in accordance with an amount of the raindrop on the windshield;

splash detection means for detecting water splashed on the windshield, wherein the splash detection means determines that the splashed water is on the windshield, when a first image captured at a first time has no high-frequency component, a second image captured at a second time subsequent to the first time has the high-frequency component, the second image includes at least two change regions, and the width of each of at least two of the at least two regions is outside the predetermined range, and the control means causes the windshield wiper to wipe the splashed water from the windshield when the splash detection means determines that the splashed water is on the windshield.

* * * * *